(12) United States Patent
Okazaki et al.

(10) Patent No.: US 6,731,449 B2
(45) Date of Patent: May 4, 2004

(54) MAGNETIC RECORDING WRITING CIRCUIT

(75) Inventors: Yasuhiro Okazaki, Tokyo (JP);
Takehiko Umeyama, Tokyo (JP);
Tsuyoshi Horiuchi, Tokyo (JP);
Hiroshi Murakami, Tokyo (JP)

(73) Assignees: Renesas Technology Corp., Tokyo (JP); Mitsubishi Electric Engineering Co., Ltd., Tokyo (JP)

( * ) Notice: Subject to any disclaimer, the term of this patent is extended or adjusted under 35 U.S.C. 154(b) by 338 days.

(21) Appl. No.: 09/878,331

(22) Filed: Jun. 12, 2001

(65) Prior Publication Data

US 2002/0105747 A1 Aug. 8, 2002

(30) Foreign Application Priority Data

Feb. 5, 2001 (JP) ........................................ 2001-028701

(51) Int. Cl.$^7$ ................................................. G11B 5/02
(52) U.S. Cl. ............................ 360/68; 360/46; 327/110
(58) Field of Search ............................... 360/68, 46, 67; 327/108, 110, 306, 560, 327, 309

(56) References Cited

U.S. PATENT DOCUMENTS 5,869,988 A 2/1999 Jusuf et al.
6,201,653 B1 * 3/2001 Contreras ..................... 360/46

FOREIGN PATENT DOCUMENTS

| JP | 8-45008 | 1/1996 |
| JP | 9-219004 | 8/1997 |
| JP | 2000-57509 | 2/2000 |

* cited by examiner

*Primary Examiner*—Alan T. Faber
(74) *Attorney, Agent, or Firm*—Leydig, Voit & Mayer, Ltd.

(57) ABSTRACT

In a magnetic recording writing circuit, a current having a higher level than a write current is supplied for a period of time during rise and fall of the write current, and a current having a lower level than the write current is supplied for a period of time during overshoot at the rise and fall of the write current. Accordingly, the write current can recover quickly from overshoot.

8 Claims, 5 Drawing Sheets

MAGNETIC RECORDING WRITING CIRCUIT

FIELD OF THE INVENTION

The present invention relates to a writing circuit in a magnetic recording apparatus such as a hard disk drive (HDD) or a floppy disk drive (FDD) drive. More particularly, this invention relates to a magnetic recording writing circuit which can arbitrarily control the waveform of a write current in writing.

BACKGROUND OF THE INVENTION

FIG. 4 is a circuit diagram of a conventional writing circuit in a magnetic recording apparatus. An arrangement of the circuit will be explained below.

As shown in FIG. 4, head 1 of this magnetic recording apparatus incorporates an equivalent circuit including inductance L1, resistor R1, capacitor C1, and resistor R3 for reducing the impedance at a resonance frequency of the head 1.

I1 denotes a reference current source for supplying a reference current for a write current Iw. The reference current source I1 is connected at one terminal to the collector of an NPN transistor Q1 and the base of another NPN transistor Q2. The base of the NPN transistor Q1 is connected to the emitter of the NPN transistor Q2 and the base of a further transistor Q16. The collector of the NPN transistor Q2 as well as the other terminal of the current source I1 are connected to a third power source V3. The emitter of the NPN transistor Q1 and the emitter of the NPN transistor Q16 are connected to a second power source V2 via two resistors R4 and R5 respectively.

The collector of the NPN transistor Q16 is connected to the emitters of two NPN transistors Q17 and Q18 which are in turn connected at their collectors to the emitters of two transistors Q19 and Q20 respectively. The collectors of the two transistors Q19 and Q20 are connected to a first power source V1. Connected between the collectors of the two transistors Q17 and Q18 is the head 1.

The bases of the transistors Q17, Q18, Q19, and Q20 are connected to four terminals J, K, L, and M respectively.

Because of a current mirror function in FIG. 4, the collector of the NPN transistor Q16 receives a current I5 which is proportional to the transistor size of both the NPN transistors Q1 and Q16 at the reference current I1.

FIG. 5 illustrates the waveforms of input voltages at the terminals J, K, L, and M and the waveforms of corresponding currents I2, I3, I4, I5, and Iw.

During the period T9, the terminals K and L are fed with signals having low logical level and the terminals J and M are fed with signals having high logical level. This switches the NPN transistors Q19 and Q18 off and the NPN transistors Q17 and Q20 on. Accordingly, during the period T9, the current running from the source V1 is passed through the NPN transistor Q20 and turned to Iw in the head 1 and the current I3 is passed through the NPN transistor Q17 and turned to I5.

During the next period T10, the current from the source V1 is passed through the NPN transistor Q19 so the current Iw in the head 1 runs in a reverse of the direction in T9. The current I2 is passed through the NPN transistor Q18 and turned to I5.

The current Iw in the head 1 has a waveform shown in FIG. 5 because of the action of inductance L1, parasitic capacitance C1, resistance R1, and damping resistance R3. More specifically, the waveform includes an overshoot at the rise a7 and its recovery a8 before the normal write signal period at one polarity and another overshoot at the fall a9 and its recovery a10 before the normal write signal period at the other polarity.

In the conventional magnetic record writing circuit, such various time factors of the current Iw or the write current for magnetic recording, which include the rise speed and overshoot at each rise a7, overshoot recovery a8, fall speed and overshoot at each fall a9, and overshoot recovery a10, can hardly be controlled.

While an arrangement for increasing the write current with a fixed level at the rise is disclosed in U.S. Pat. No. 5,869,988, no attempt has been successfully made to provide a magnetic recording writing circuit controlling the overshoot and the overshoot recovery and modifying the current in response to a change in the reference current I1.

SUMMARY OF THE INVENTION

It is an object of this invention to provide a magnetic record writing circuit which can control the rise and fall of a write current to minimize the write time and the overshoot period.

In the magnetic record writing circuit according to one aspect of this invention, an arrangement is provided such that, a current having a higher level than a level of a write current is supplied for a desired period of time during rise and fall of the write current, and a current having a lower level than the level of the write current is supplied for a desired period of time during overshoot at the rise and fall of the write current.

In the magnetic record writing circuit according to another aspect of this invention, the current for driving a head is supplied by the action of a transistor group where the current source transistor is joined in parallel with at least one damping transistor and released from the head by the action of load transistors via a mirror transistor which comprises a reference current source and a mirror circuit.

Other objects and features of this invention will become apparent from the following description with reference to the accompanying drawings.

DESCRIPTION OF THE PREFERRED EMBODIMENTS

Figure 1:
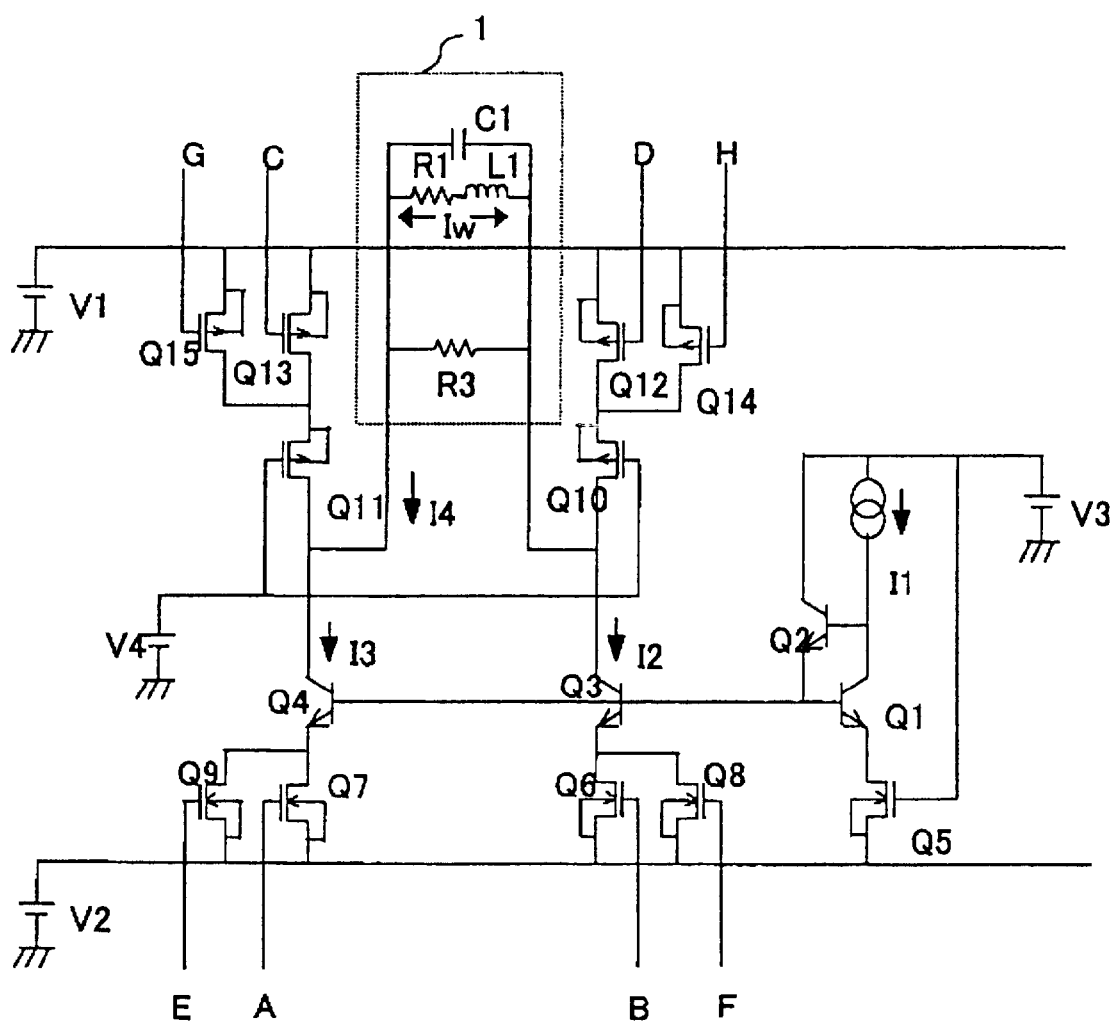
FIG. 1 is a circuit diagram of the magnetic record writing circuit according to a first embodiment of the present invention.

FIG. 1 is a circuit diagram of the first embodiment of the present invention. The head 1 in this magnetic recording apparatus is identical to the same shown in FIG.

In FIG. 1, I1 denotes reference current source for supplying a reference current for a write current Iw. The reference current source I1 is connected at one terminal to the collector of an NPN transistor Q1 and the base of another NPN transistor Q2. The base of the NPN transistor Q1 is connected to the emitter of the NPN transistor Q2 and the bases of further transistors Q3 and Q4. The collector of the NPN transistor Q2 as well as the other terminal of the current source I1 are connected to a third power source V3. The emitter of the NPN transistor Q1 and the emitters of the NPN transistors Q3 and Q4 are connected to a second power source V2 via an NMOS transistor Q5, two NMOS transistors Q6 and Q8, and two NMOS transistors Q7 and Q9 respectively. While the base of the NMOS transistor Q5 is connected to a third power source V3, the bases of the NMOS transistors Q6, Q7, Q8, and Q9 are connected to four terminals B, A, F, and E respectively.

The collector of the NPN transistor Q3 is connected to the drain of a PMOS transistor Q10 which is in turn connected at its source and back gate to the drain of a PMOS transistor Q12 serving as the current source transistor and the drain of a PMOS transistor Q14 serving as the damping transistor respectively.

The collector of the NPN transistor Q4 is connected to the drain of the PMOS transistor Q11 which is in turn connected at its source and back gate to the drain of a PMOS transistor Q13 serving as the current source transistor and the drain of a PMOS transistor Q15 serving as the damping transistor respectively.

The sources and back gates of the PMOS transistors Q12, Q13, Q14, and Q15 are connected to the first power source V1. The gates of the PMOS transistors Q10 and Q11 are connected to a fourth power source V4. The PMOS transistors Q10 and Q11 act as the protective transistors for inhibiting the application of no breakdown voltage to between the source and the drain of each of the PMOS transistors Q12, Q13, Q14, and Q15. The use of the protective transistors is not mandatory so long as a voltage greater than the breakdown voltage is not applied between the source and the drain of each transistor.

The gates of the PMOS transistors Q12 and Q13 serving as the current source transistors are connected to two terminals D and C respectively. Also, the gates of the PMOS transistors Q14 and Q15 serving as the damping transistors are connected to two terminals H and G respectively.

Figure 2:
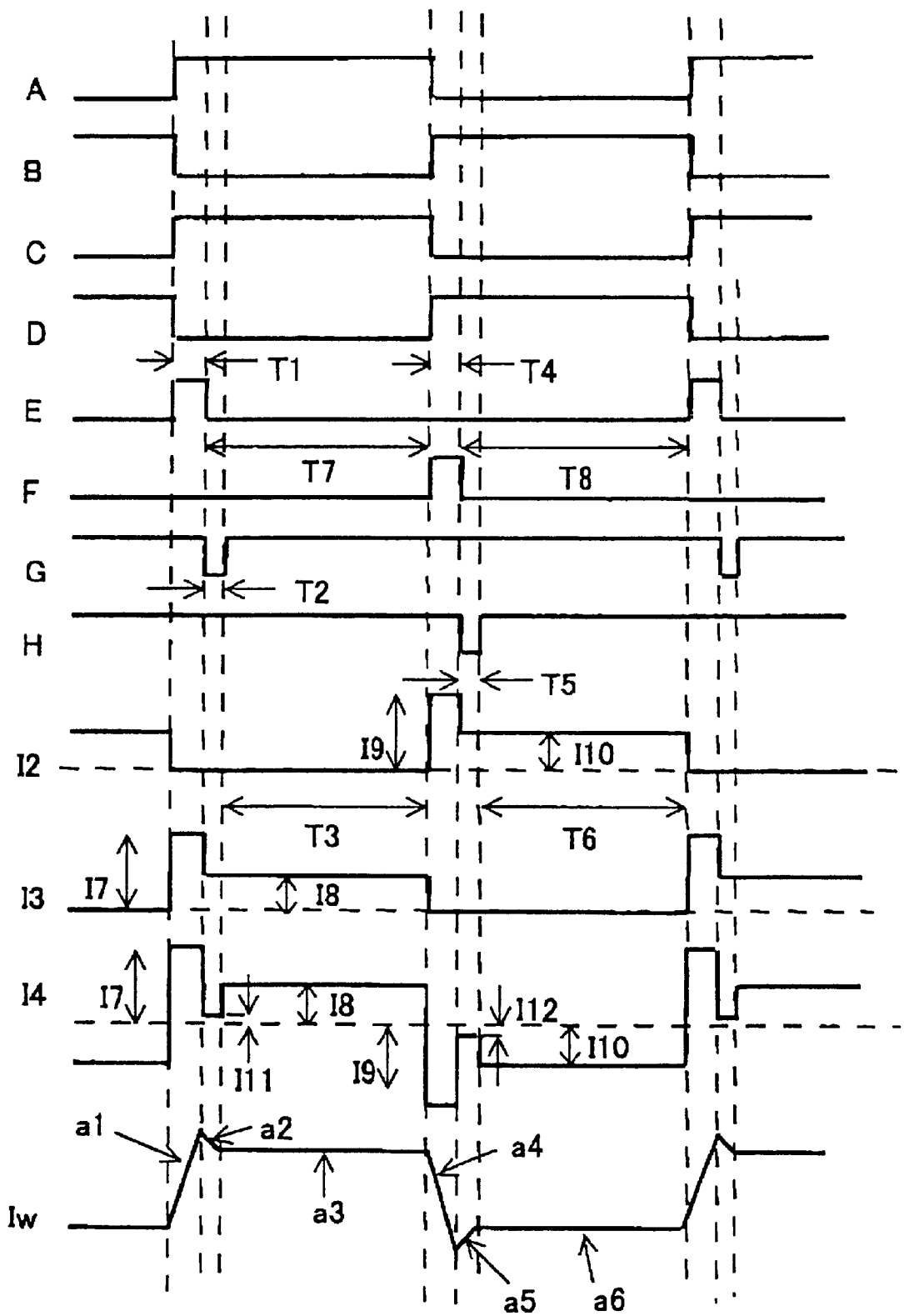
FIG. 2 is a diagram showing the control waveform and other signals according to the first embodiment.

FIG. 2 illustrates the waveform of voltage signals applied to the terminals A, B, C, D, E, F, G, and H, collector currents I2 and I3 at the corresponding NPN transistors Q3 and Q4, drain currents I4 and I5 at the corresponding PMOS transistors Q10 and Q11, and the current Iw at the head 1.

As the NPN transistors Q1, Q2, Q3, and Q4 are arranged in a current mirror circuit, the currents I2 and I3 running through the collectors of the corresponding NPN transistors Q3 and Q4 are proportional to the current I1 as shown in FIG. 2. The NOMS transistors Q5, Q6, Q7, Q8, and Q9 are load transistors acting as the emitter resistors of the transistors Q1, Q3, and Q4 in the current mirror circuit and can thus be switched on and off by their respective controls signals A, B, E, and F.

The voltages and currents at the terminals A to H will now be explained referring to FIG. 2.

In the beginning, the terminals A, C, E, and F are fed with signals having low logical level, while the other terminals B, D, G, and H are fed with signals having high logical level. As the current Iw in the head 1 runs in the rightward direction, the current I2 is allowed to flow constantly at a level of I10.

Figure 5:
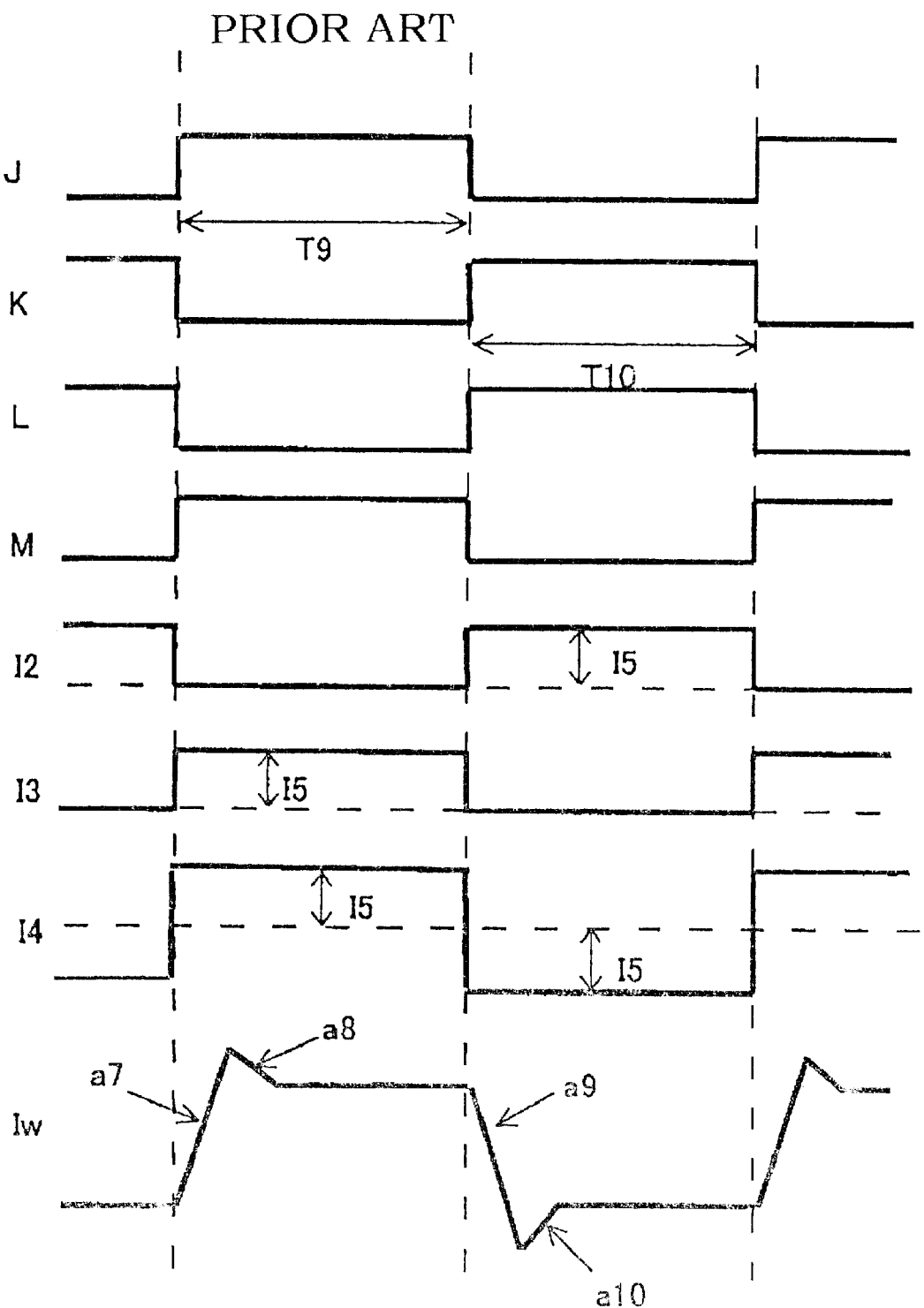
FIG. 5 is a diagram of the waveform of conventional control and other signals.

During the period T1, the terminals A, C, E, G, and H receive signals having high logical level while the terminals B, D, and F are fed with signals having low logical level. Hence, the current Iw in the head 1 runs in the leftward direction and is then increased by means of the capacitance C1 as denoted by a1. At the time, as the two load transistors Q7 and Q9 are switched on, the currents I3 and I4 are at relatively a high level I7. Since the NPN transistor Q4 is favorably reduced in the load resistance, the rise a1 of the current Iw becomes quicker than the rise a7 shown in FIG. 5.

This is followed by the period T2 in which the terminals A, C, and H receives signals having high logical level while the other terminals B, D, E, F, and G are fed with signals having low logical level. As the current Iw in the head 1 remains running in the leftward direction, the NMOS transistor Q9 is switched off and the PMOS transistor Q15 is turned on. This shifts the current I3 to a level I8 and the current I4 to a level I11. As a result, the current Iw is quickly declined to offset the overshoot at the rise (denoted by a2).

During the period T3, the terminals A, C, G, and H are fed with signals having high logical level while the other terminals B, D, E, and F receive signals having low logical level. As the current Iw in the head 1 runs in the leftward direction at a constant level (a3). At the time, the currents I3 and I4 are at the level I8.

The period T4 then follows where the terminals B, D, F, G, and H receive signals having high logical level while the terminals A, C, and E are fed with signals having low logical level. Hence, the current Iw in the head 1 runs in the rightward direction and is then increased by means of the capacitance C1 (a4) similar to a1. At the time, as the two load transistors Q6 and Q8 are switched on, the currents I2 and I4 are at relatively high level I9. Since the NPN transistor Q3 is favorably reduced in the load resistance, the fall a4 of the current Iw becomes quicker than the rise a9 shown in FIG. 5.

B, D, and G receive signals having high logical level while the other terminals A, C, E, F, and H are fed with signals having low logical level. As the current Iw in the head 1 remains running in the rightward direction, the NMOS transistor Q8 is switched off and the PMOS transistor Q14 is turned on. This shifts the current I2 to the level I10 and the current I4 to a level I12. As a result, the current Iw is quickly declined to offset the overshoot at the fall (denoted by a5).

During the period T6, the terminals B, D, G, and H are fed with signals having high logical level while the other terminals A, C, E, and F receive signals having low logical level. As the current Iw in the head 1 runs in the rightward direction at a constant level (a6). At the time, the currents I3 and I4 are at the level I10.

As described above, the current Iw in the head 1 has a waveform shown in FIG. 2 where the rise a1 can be controlled by the period T1 and the current level I7. This will contribute to the faster rise of signals in the magnetic recording apparatus.

Also, the overshoot which is inevitable at the faster rise a1 can successfully be offset by a2 for having a stable waveform of the signal, hence allowing the signals in the magnetic recording apparatus to response faster. Equally, the overshoot at the fall a4 can be offset by the overshoot recovery (a5).

The waveform of the current Iw shown in FIG. 2 is reversed between the T1+T7 period and the T4+T8 period. This indicates that the current flows in opposite directions.

The current levels I7 I8, I9, and I10 can arbitrarily be determined to desired settings depending on the reference current I1 and the transistor size of the load transistors Q5, Q6, Q7, Q8, and Q9. The current levels I11 and I12 can also be determined to desired settings depending on the transistor size of the PMOS transistors Q10, Q11, Q14, and Q15 and the resistors R1 and R3.

In addition, the periods T1, T2, T4, and T5 may be determined to desired lengths using delay circuits or the like.

Power source by the PMOS transistors Q15, Q11, Q10, and Q14 during the period T2, the PMOS transistors Q15, Q11, Q10, and Q14 act as damping resistances for hastening the recovery a2 to the level of a3. Also, during the period T5, the recovery a5 is hastened to gain the level of a6.

As the current levels I7 and I9 are determined proportional to the reference current I1, the amplitude of the current Iw may be modified by changing the reference current I1 but its waveform remains almost unchanged.

It is understood that the NPN transistors and the PMOS transistors in the circuit shown in FIG. 1 can be replaced by PNP transistors and NMOS transistors respectively without diminishing the above functions and effects.

Figure 3:
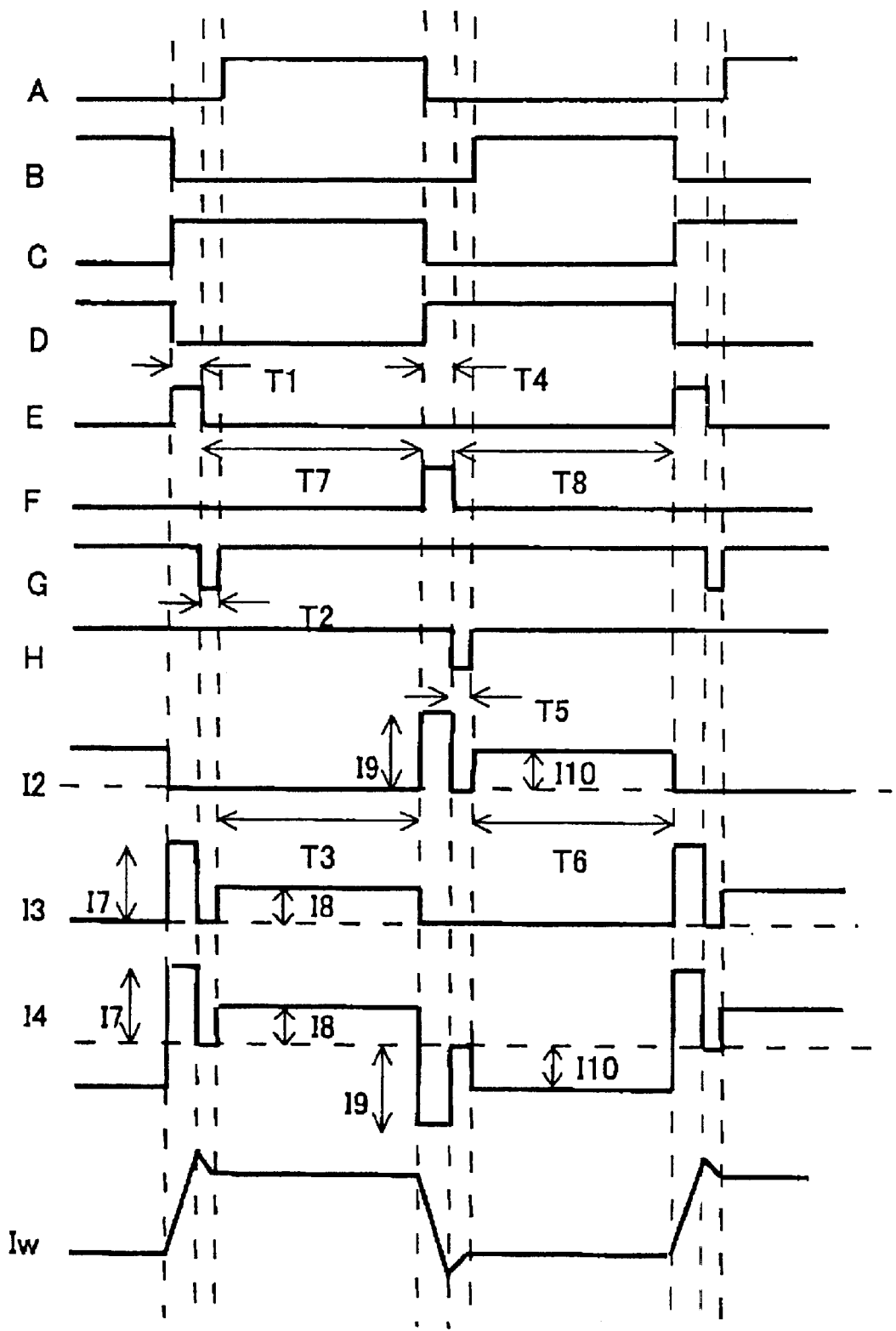
FIG. 3 is a diagram showing the control waveform and other signals according to a second embodiment.
Figure 4:
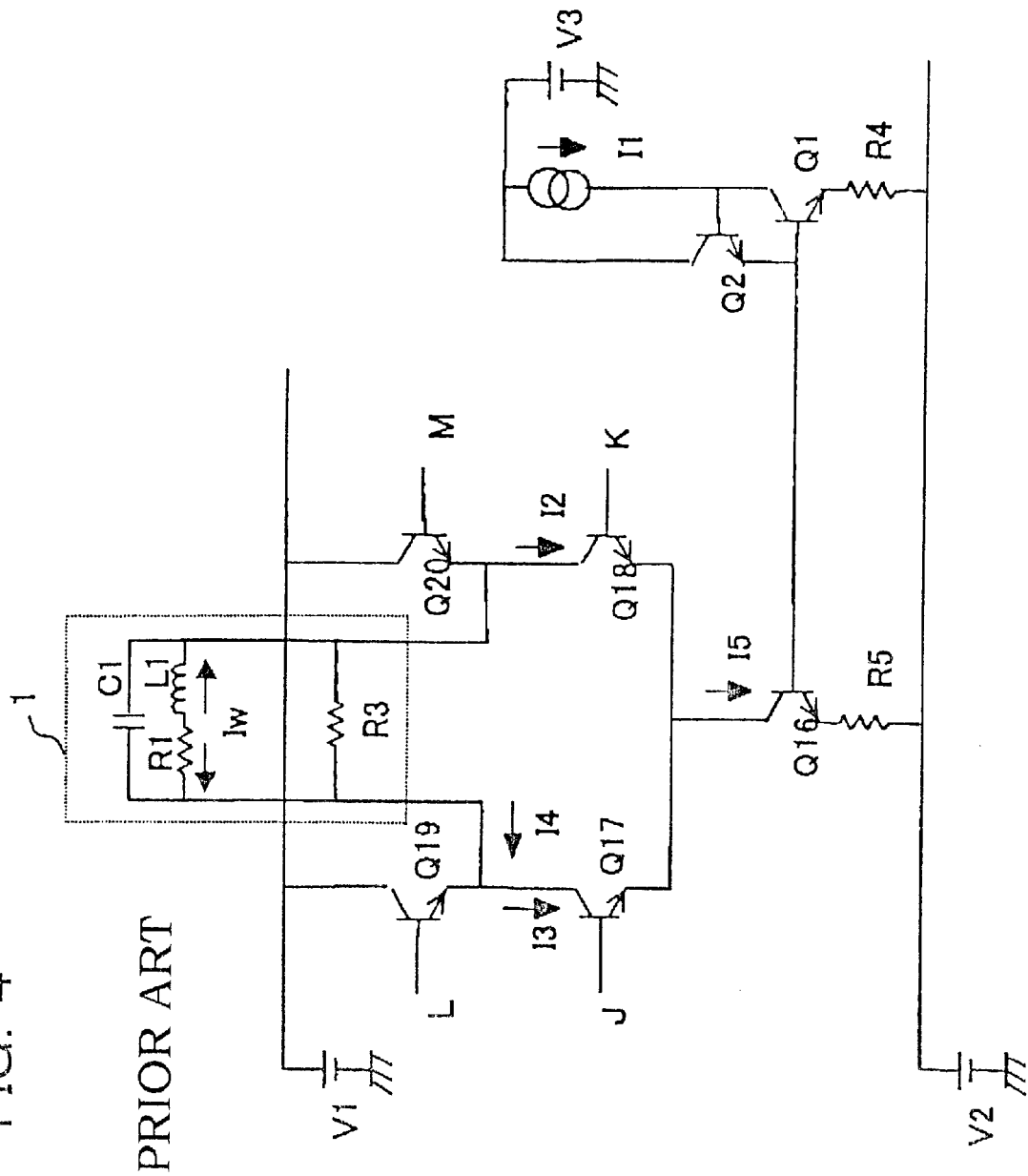
FIG. 4 is a diagram of a conventional magnetic record writing circuit.

The second embodiment of the present invention is shown in FIG. 3 where the waveform of voltages applied to the terminals A and B are different from those in the first embodiment. Resultant waveform of the current Iw in the second embodiment, however, is similar to that in the first embodiment.

In the second embodiment, the currents I2 and I3 are zero during the periods T2 and T5. Accordingly, the consumption of power will be smaller than that of Embodiment 1.

Also, the periods T1, T2, T4, and T5 can be determined by means of a DAC which permits more precise control over the waveform of the current Iw.

As explained above, in the magnetic record writing circuit of this invention, an arrangement is provided such that, a current having a higher level than a level of a write current is supplied for a desired period of time during rise and fall of the write current, and a current having a lower level than the level of the write current is supplied for a desired period of time during overshoot at the rise and fall of the write current. Therefore, sharp rise of the write current can be ensured.

Furthermore, when current having a higher level than a level of a write current is supplied, the level of the write current is not fixed but it is varied in proportion to the level of the write current. Therefore, there is no change the setting even if the level of the write current is changed.

Furthermore, MOS transistors are employed as the load transistors. Therefore, stable resistance can be achieved.

Furthermore, protective transistors are provided between the current source transistor and damping transistor and the mirror transistor. Therefore, it is prevented that a voltage greater than the breakdown voltage is applied to both the current source transistor and the damping transistor.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A magnetic recording writing circuit comprising:
    a first current path that includes
        a first transistor circuit supplying a current;
        a first current mirror circuit connected in series with the first transistor circuit; and
        a second transistor circuit connected in series with the first current mirror circuit serving as a load transistor;
    a second current path that includes
        a third transistor circuit supplying a current;
        a second current mirror circuit connected in series with the third transistor circuit; and
        a fourth transistor circuit connected in series to the second current mirror circuit as a load transistor; and
    a magnetic recording head connected between the first current path and the second current path.

2. The magnetic recording writing circuit according to claim 1, wherein the magnetic recording head is supplied with a current that is controlled by the first, second, third, and fourth transistor circuits.

3. The magnetic recording writing circuit according to claim 1, wherein the magnetic recording head comprises a first terminal and a second terminal, the first terminal is connected between the first transistor circuit and the first current mirror circuit, and the second terminal is connected between the third transistor circuit and the second current mirror circuit.

4. The magnetic recording writing circuit according to claim 1, wherein each of the first, second, third, and fourth transistor circuits includes two transistors connected in parallel with each other.

5. The magnetic recording writing circuit according to claim 1, wherein at least one of the first, second, third, and fourth transistor circuits includes an MOS transistor.

6. The magnetic recording writing circuit according to claim 1, wherein the magnetic recording head includes:
    an inductor;
    a first resistor connected in series with the inductor;
    a capacitor connected across the inductor and the first resistor; and
    a second resistor connected across the inductor and the first resistor.

7. The magnetic recording writing circuit according to claim 1, further comprising
    a first protective circuit connected between the first transistor circuit and the first current mirror circuit, and
    a second protective circuit connected between the third transistor circuit and the second current mirror circuit.

8. The magnetic recording writing circuit according to claim 7, wherein each of the first and second protective circuits includes an MOS transistor.

* * * * *